United States Patent
Mizuno et al.

(10) Patent No.: US 6,378,584 B1
(45) Date of Patent: Apr. 30, 2002

(54) RUBBER COMPOSITION FOR TIRE TREAD INCLUDING SILICA AND RICE HUSK

(75) Inventors: Yoichi Mizuno, Osaka; Masato Kawase, Takarazuka; Toshiro Matsuo, Kakogawa, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/266,945

(22) Filed: Mar. 12, 1999

(30) Foreign Application Priority Data

Mar. 13, 1998 (JP) ............................................. 10-063427

(51) Int. Cl.[7] .............................. B60C 1/00; B60C 11/00
(52) U.S. Cl. ...................... 152/209.4; 152/211; 524/492
(58) Field of Search ........................... 152/209.4, 209.5, 152/905, 211; 524/492, 493

(56) References Cited

U.S. PATENT DOCUMENTS

| | | | | | |
|---|---|---|---|---|---|
| 2,434,207 A | * | 1/1948 | Gapen et al. | ................ | 152/211 |
| 2,585,219 A | * | 2/1952 | Boyle | .......................... | 152/211 |
| 2,607,386 A | * | 8/1952 | Pavlik | ......................... | 152/211 |
| 2,675,047 A | * | 4/1954 | Andy | .......................... | 152/211 |
| 2,739,135 A | * | 3/1956 | Delang | ........................ | 152/211 |
| 2,806,502 A | * | 9/1957 | Andy | .......................... | 152/211 |
| 4,254,812 A | * | 3/1981 | Roker et al. | ................. | 152/211 |
| 5,049,598 A | * | 9/1991 | Saito et al. | .............. | 152/209.4 |
| 5,393,821 A | * | 2/1995 | Shieh et al. | ................ | 524/492 |
| 2,065,968 A | * | 12/1996 | Goltstein | ................ | 152/209.4 |
| 5,851,321 A | * | 12/1998 | Midorikawa et al. | ....... | 524/492 |
| 5,967,211 A | * | 10/1999 | Lucas et al. | ............. | 152/209.4 |

FOREIGN PATENT DOCUMENTS

| | | | | |
|---|---|---|---|---|
| JP | 2-274740 | * | 11/1990 | .............. 152/209.4 |
| JP | 3-262707 | * | 11/1991 | .............. 152/209.4 |
| JP | 6-240052 | * | 8/1994 | .............. 152/209.4 |
| JP | 6-248117 | * | 9/1994 | .............. 152/209.4 |
| JP | 873657 | | 3/1996 | |
| JP | 2554536 | | 8/1996 | |

OTHER PUBLICATIONS

Abstracts for Japan 2–274740.*
Abstract for Japan 8–73657.*
Database WPI, Section Ch, Week 9439, Derwent Publications Ltd., London, GB; AN 94–313815, XP002107624 and JP 06 240052 A (Sumitomo Rubber Ind Ltd) Aug. 30, 1994 (Abstract).
Database WPI, Section Ch, Week 9440, Derwent Publications Ltd., London, GB; AN 94–322292, XP002107624 and JP 06 248117 A (Sumitomo Rubber Ind Ltd) Sep. 6, 1994 (Abstract).

* cited by examiner

*Primary Examiner*—Steven D. Maki
(74) *Attorney, Agent, or Firm*—Birch, Stewart, Kolasch & Birch, LLP

(57) ABSTRACT

There is provided a rubber composition for tire tread, which can provide a tire having low decrease in abrasion resistance and balanced performance of traction property, braking property and cornering property. The rubber composition for tire tread is obtained by mixing 100 parts by weight of at least one rubber component selected from the group consisting of a natural rubber, an isoprene rubber and a butadiene rubber, 5 to 45 parts by weight of a silica, 0.5 to 4.0 parts by weight of a silane coupling agent and 3 to 8 parts by weight of a powdered article containing cellulose material.

6 Claims, No Drawings

RUBBER COMPOSITION FOR TIRE TREAD INCLUDING SILICA AND RICE HUSK

BACKGROUND OF THE INVENTION

The present invention relates to a rubber composition for tire tread, which can provide a tire having low decrease in abrasion resistance and balanced performance of traction property, braking property and cornering property.

As a factor controlling friction between tread rubber and road surface, which has an effect on a grip property of tire, examples thereof are adhesive friction, digging friction and hysteresis friction.

In order to improve the adhesive friction by softening a rubber of tread and increasing contact area between a tread rubber and road surface, there have been investigated a method of decreasing of an amount of filler in a rubber composition for tire tread, a method of using of a butadiene rubber or an isoprene rubber which do not harden simply at a low temperature, and a method of addition of a softening agent. But in these cases, there arises a problem that the obtained tire is lack in handling stability and abrasion resistance.

From the viewpoint of maintaining handling stability and abrasion resistance, there is disclosed a method improving wet grip property and ice grip property, in which the adhesive friction is increased by decreasing modulus at a low temperature by using both silica as a part of filler (carbon black) and a silane coupling agent (Japanese Unexamined Patent Publication No.73657/1996). In this case the cornering property of the obtained tire is improved, but traction property and braking property are not improved sufficiently.

On the other hand, in order to improve the digging friction, there have been investigated a method by using a rubber foam as a rubber component and a method by using an organic fiber. In these cases the traction property and the braking property are improved, but the cornering property is not improved sufficiently.

In order to improve the hysteresis friction, there have been investigated a method by employing a stirene-butadiene rubber and a method by increasing an amount of a filler. But there arises a problem that hardness becomes high without relation with property on snow and ice.

Namely there is not provided a rubber composition for tire tread having low decrease in abrasion resistance and balanced performance of traction property, braking property and cornering property.

SUMMARY OF THE INVENTION

It is an object of the present invention to provide a rubber composition for tire tread, having low decrease in abrasion resistance and balanced performance of traction property, braking property and cornering property.

The present invention relates to a rubber composition for tire tread comprising 100 parts by weight of at least one rubber component selected from the group consisting of a natural rubber, an isoprene rubber and a butadiene rubber, 5 to 45 parts by weight of a silica, 0.5 to 4.0 parts by weight of a silane coupling agent and 3 to 8 parts by weight of a powdered article containing cellulose material.

An average particle diameter of the above-mentioned powdered article is preferably 20 to 600 μm.

Further the present invention relates to a truck and bus tire by using the rubber composition for tire tread.

DETAILED DESCRIPTION

The rubber component employed in the present invention is at least one rubber selected from the group consisting of a natural rubber (NB), an isoprene rubber (IR) and a butadiene rubber (BR) from the viewpoint of reinforcement and property at a low temperature.

In case of a combination use of two or more thereof, a combination ratio can be suitably selected by the person skilled in the art. The combination ratio of NR and BR may be 100-0:30-70 (weight ratio).

As the silica employed in the present invention, the conventional silica employed in tire field can be employed without particular limitation.

As the silica put on the market, examples thereof are, for instance, Ultrasil VN3 (available from Deggusa Japan Co. Ltd.), Nipsil VN3 (available from Nippon Silica Co. Ltd.), Nipsil AQ (available from Nippon Silica Co. Ltd.), Tokusil UR (available from Tokuyama Corporation), Z1115Mp (available from RHÔNE-POULENC CO.), Z1165Mp (available from RHÔNE-POULENC CO.) and the like.

The amount of the silica in the present invention is 5 to 45 parts by weight based on 100 parts by weight of the above-mentioned rubber component. From the viewpoint of balance of snow and ice performance and an abrasion resistance, the amount is preferably 10 to 40 parts by weight, more preferably 20 to 30 parts by weight.

As the silane coupling agent employed in the present invention, the conventional silane coupling agent can be employed without particular limitation. Examples thereof are bis(3-triethoxysilylpropyl)tetrasulfen, α-mercaptopropyltrimethoxysilane, 3-thiocyanatepropyltriethoxysilane, bis(3-triethoxysilylpropyl)disulfen and the like.

The amount of the silane coupling agent in the present invention is 8 to 10% by weight from the viewpoint of the effect of reinforcement and the higher cost.

The powdered article containing cellulose material employed in the present invention is described in Japanese. Patent No.2554536. Examples thereof are rice husks of rice, wheat husks, pieces of cork, sawdusts and the like. And the powdered article may contain a silica, a clay, a woody component, a fatty acid, water and the like as the component except for cellulose material.

Japanese Patent No.2554536 discloses a rubber composition containing the above-mentioned powdered article, but it does not refer to using of a silica as a filler same as the rubber composition of the present invention and a silane coupling agent.

It is easy for the powdered article to be dispersed in a mixing process, since it contains cellulose in its component and the compatibility with the rubber becomes good. The article is fallen away easily due to abrasion at running. But tearing strength does not lower and a crack of tread is not formed easily, since it forms a weak bonding with a rubber.

There is not provided a problem of abrasion of the paved road surface in case of using the material having a higher hardness as a metal, or a problem of decrease in an adhesive effect with the surface of the frozen road due to increase of the hardness of the total rubber. On the other hand, spike is not sufficiently demonstrated by using the material having lower hardness than the cellulose. The hardness of ground plants such as rice husks of rice, wheat husks, pieces of cork, sawdusts and the like, is suitable from this point of view. Among those the rice husks of rice are more preferable, since the hardness of rice husks is suitable. Since the rice husks as a natural product are powders having unevenness, they are compatible with a rubber and have properties that not only tearing strength but also crack performance of tread are not lowered.

An average particle size of the powdered article is preferably 20 to 600 μm, more preferably 100 to 200 μm. If the diameter thereof is below 20 μm, the desired effect of spike is not sufficient. If the diameter thereof is above 600 μm, reinforcement and abrasion become weak. And an adhesive effect (grip performance on ice) is apt to decrease, since the surface of tread after running becomes easily rough and the contact area of rubber with ice surface becomes decreasing. From the viewpoint of balance of reinforcement and performance, the diameter is particularly more preferably 100 to 120 μm.

The amount of the powdered article containing cellulose material in a rubber composition is preferably 3 to 8 parts by weight based on 100 parts by weight of the rubber. If the amount is below 3 parts by weight, it is difficult to demonstrate the desired effect of spike sufficiently. On the other hand, if the amount is above 8 parts by weight, the adhesive effect is apt to decrease and abrasion property tends to be insufficient, since the powdered articles themselves are in contact with the road surface due to the hardness of rubber and the contact area with the base rubber and the ice surface becomes decreasing.

To the rubber composition of the present invention can be suitably added, except for the above-mentioned components, for example, a filler such as talc, cray and carbon black; a softening agent such as a process oil of paraffin, aromatic, naphthene; a tackifier such as a coumarone indene resin, a rosin resin and a cyclopentadienyl resin; a vulcanizing agent such as sulfur and peroxide; an accelerator; a vulcanizing assistant such as stearic acid and zinc oxide; an antioxidant and the like, if necessary in the range of not losing the object of the present invention.

The rubber composition of the present invention can be obtained by the conventional method with a bunbury mixer, an open roll and the like.

The rubber composition of the present invention obtained by the above-mentioned method can be preferably employed as tire tread.

A tire of the rubber composition employed as tire tread, especially a studless tire, shows an effect of spike by the method that the powdered article containing cellulose material harder than the base rubber appeared on the surface of tread rubber scratches the road surface in case of running on frozen road, particular in braking, accelerating and circling. And the grip performance on ice can be drastically improved, since an opening, an unevenness and an edge, formed on the surface of the tread by dropping of the powdered article from the surface of the tread due to the abrasion, improve friction with the surface of ice.

EXAMPLES

The present invention is further explained in details based on the Examples concretely, but is not limited thereto.

Table 1 shows an each component employed in Examples based on 60 parts by weight of NR and 40 parts by weight of BR.

TABLE 1

| butadiene rubber (BR) | | BR150B available from UBE Industries, Ltd. |
|---|---|---|
| silica | | Ultrasil VN3 available from Deggusa Co. Ltd. |
| carbon black | A | Diablack N220 available from Mitsubishi Chemical Corporation |
| | B | Showblack N110 available from Showa Cabot Co. Ltd. |
| silane coupling agent | | Si69 available from Deggusa Co. Ltd. bis(3-triethoxysilylpropyl)tetrasulfen |
| powdered article containing cellulose | A | Sumicellco available from Sumitomo Seika Chemicals Co., Ltd. (cellulose material: rice husks of rice, average particle diameter 100–120 μm) |
| | B | Sumicellco available from Sumitomo Seika Chemicals Co., Ltd. particle diameter 400–600 μm) |
| | C | Sumicellco available from Sumitomo Seika Chemicals Co., Ltd. (cellulose material: rice husks of rice, average particle diameter 40–60 μm) |
| process oil | | Diana process PS32 available from Idemitsu Kosan Co. Ltd. |
| wax | | Sannoxwax available form Ohuchi Shinko Kagaku Kogyo Co. Ltd. |
| antioxidant | | Ozonone 6C available from Seiko Chemical Co. Ltd. |
| stearic acid | | Kiri available form NOF CORPORATION |
| zinc oxide | | Ginrei R available from Toho Zinc Co., Ltd. |
| sulfur | | Sulfur available from Tsurumi Chemical Co. Ltd. |
| accelerator | | NOCCELER NS available from Ohuchi Shinko Kagaku Kogyo Co. Ltd. |

Examples 1 to 10

After mixing the component, of which amounts were shown in Table 2, by a bunbury mixer, the mixture was vulcanized for 45 minutes at 150° C. to obtain the rubber compositions 1 to 10. The obtained rubber compositions 1 to 10 were evaluated by measuring the following experiments.

[Experimental Methods]

(1) Hardness of Rubber(Hs)

Hardness of rubber was measured at 25° C. by the method described in JIS K6301. From the viewpoint of handling stability and abrasion resistance on wet or dry road, Hs is preferably large. But from the viewpoint of performance on snow and ice it is not preferably too large. It may be 60 to 68.

(2) Abrasion Test

Abrasion test was measured by using Lambourn abrasion test machine made by Iwamoto Seisakusho Co. Ltd. at the condition of surface rotating speed 50 m/min, load weight 2.5 kg, amount of falling sands 15 g/min, slip ratio 25% as abrasion 1 and slip ratio 50% as abrasion 2. The results were shown by using an index based on the following Comparative Example 1 as 100. The larger the index becomes, the more excellent the abrasion resistance becomes.

(3) Car Performance

Studless tires for track and bus having tread of the obtained rubber composition were prepared by the conventional method. The tires were attached to a truck having a weight of 10 ton, car performances were evaluated at Hokkaido Nayoro test course by the following methods.

(i)Cornering Time

At −13 to −4° C. the running time was measured at the 8-shaped circular circuit having a few hundred meters length. The results were shown by using an index based on the following Comparative Example 1 as 100. The larger the index becomes, the more excellent the cornering property becomes.

(ii)Climbing Time

At −13 to −4° C. in order to confirm the traction for the front and rear direction, the running time was measured at the climbing road in the test course. The results were shown by using an index based on the following Comparative Example 1 as 100. The larger the index becomes, the more excellent the traction property becomes.

(iii) Braking Distance on Ice

At −4 to −2° C. running at 30 km/h, the braking distance on ice was measured. The results were shown by using an index based on the following Comparative Example 1 as 100. The larger the index becomes, the more excellent the braking property becomes.

Comparative Examples 1 to 14

Except for the amount shown in Table 3, comparative rubber compositions 1 to 6 were obtained and evaluated same as in Example 1. The results are shown in Table 3.

TABLE 2

|  | Example | | | | | | | | | |
|---|---|---|---|---|---|---|---|---|---|---|
|  | 1 | 2 | 3 | 4 | 5 | 6 | 7 | 8 | 9 | 10 |
| carbon black | | | | | | | | | | |
| A | 40 | 25 | 5 | 25 | 5 | 25 | 5 | — | 25 | 25 |
| B | — | — | — | — | — | — | — | 20 | — | — |
| silica | 5 | 20 | 40 | 20 | 40 | 20 | 40 | 20 | 20 | 20 |
| silane coupling agent | 0.5 | 2 | 4 | 2 | 4 | 2 | 4 | 2 | 2 | 2 |
| powdered article | | | | | | | | | | |
| A | 3 | 3 | 3 | 5 | 5 | 8 | 8 | 5 | — | — |
| B | — | — | — | — | — | — | — | — | 5 | — |
| C | — | — | — | — | — | — | — | — | — | 5 |
| process oil | 3.5 | 2.5 | 1.5 | 3.5 | 2.5 | 5 | 4 | 2.5 | 3.5 | 3.5 |
| wax | 2 | 2 | 2 | 2 | 2 | 2 | 2 | 2 | 2 | 2 |
| antioxidant | 1 | 1 | 1 | 1 | 1 | 1 | 1 | 1 | 1 | 1 |
| stearic acid | 3 | 3 | 3 | 3 | 3 | 3 | 3 | 3 | 3 | 3 |
| zinc oxide | 3 | 3 | 3 | 3 | 3 | 3 | 3 | 3 | 3 | 3 |
| sulfur | 1 | 1 | 1 | 1 | 1 | 1 | 1 | 1 | 1 | 1 |
| accelerator | 1.5 | 1.5 | 1.5 | 1.5 | 1.5 | 1.5 | 1.5 | 1.5 | 1.5 | 1.5 |
| Hs (25° C.) | 62 | 63 | 62 | 61 | 62 | 62 | 62 | 62 | 62 | 62 |
| abrasion | | | | | | | | | | |
| 1 | 98 | 98 | 93 | 93 | 96 | 88 | 87 | 95 | 89 | 94 |
| 2 | 93 | 92 | 88 | 86 | 85 | 80 | 81 | 90 | 83 | 89 |
| car performance | | | | | | | | | | |
| traction property | 107 | 111 | 113 | 117 | 116 | 119 | 120 | 117 | 119 | 116 |
| cornering property | 105 | 111 | 113 | 113 | 114 | 116 | 116 | 112 | 112 | 113 |
| braking property | 104 | 108 | 110 | 112 | 112 | 116 | 117 | 113 | 115 | 112 |

TABLE 3

|  | Comparative Example | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Carbon black | | | | | | | | | | | | | | |
| A | 45 | 40 | 35 | 25 | 15 | 5 | 0 | 45 | 45 | 45 | 45 | 45 | 25 | 25 |
| B | — | — | — | — | — | — | — | — | — | — | — | — | — | — |
| silica | — | 5 | 10 | 20 | 30 | 40 | 45 | — | — | — | — | — | 20 | 20 |
| silane coupling agent | — | 0.5 | 1 | 2 | 3 | 4 | 45 | — | — | — | — | — | 2 | 2 |
| powdered article | | | | | | | | | | | | | | |
| A | — | — | — | — | — | — | — | 1 | 3 | 5 | 8 | 15 | 1 | 15 |
| B | — | — | — | — | — | — | — | — | — | — | — | — | — | — |
| C | — | — | — | — | — | — | — | — | — | — | — | — | — | — |
| process oil | 2 | 2 | 1.5 | 1 | 0.5 | 0 | 0 | 2.5 | 3 | 4.5 | 6 | 9.5 | 2.5 | 8.5 |
| wax | 2 | 2 | 2 | 2 | 2 | 2 | 2 | 2 | 2 | 2 | 2 | 2 | 2 | 2 |
| antioxidant | 1 | 1 | 1 | 1 | 1 | 1 | 1 | 1 | 1 | 1 | 1 | 1 | 1 | 1 |
| stearic acid | 3 | 3 | 3 | 3 | 3 | 3 | 3 | 3 | 3 | 3 | 3 | 3 | 3 | 3 |
| zinc oxide | 3 | 3 | 3 | 3 | 3 | 3 | 3 | 3 | 3 | 3 | 3 | 3 | 3 | 3 |
| sulfur | 1 | 1 | 1 | 1 | 1 | 1 | 1 | 1 | 1 | 1 | 1 | 1 | 1 | 1 |
| accelerator | 1.5 | 1.5 | 1.5 | 1.5 | 1.5 | 1.5 | 1.5 | 1.5 | 1.5 | 1.5 | 1.5 | 1.5 | 1.5 | 1.5 |
| Hs (25° C.) | 62 | 63 | 62 | 62 | 62 | 62 | 62 | 62 | 62 | 62 | 62 | 63 | 62 | 62 |
| abrasion | | | | | | | | | | | | | | |
| 1 | 100 | 99 | 99 | 100 | 99 | 98 | 97 | 98 | 98 | 95 | 92 | 82 | 99 | 77 |
| 2 | 100 | 98 | 98 | 97 | 95 | 95 | 95 | 98 | 93 | 91 | 83 | 69 | 96 | 68 |

TABLE 3-continued

| | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| car performance | | | | | | | | | | | | | | |
| traction property | 100 | 101 | 103 | 105 | 106 | 106 | 106 | 101 | 107 | 113 | 115 | 115 | 106 | 119 |
| cornering property | 100 | 106 | 106 | 112 | 114 | 113 | 114 | 100 | 100 | 102 | 104 | 105 | 112 | 114 |
| braking property | 100 | 100 | 102 | 103 | 103 | 103 | 104 | 102 | 105 | 110 | 111 | 113 | 103 | 116 |

As is clear from the results in Examples 1 to 7, decrease of the abrasion resistance of the rubber composition of the present invention is slight and the composition is excellent in traction property, braking property and cornering property.

As is clear from the results in Example 8, even if changing a type of carbon black, the excellent performances were shown similarly. And from the results of Examples 8 to 10, the powdered articles having an average diameter of 100 to 120 μm were excellent in balance of abrasion resistance on snow and ice.

As is clear from the results in Examples 1 to 7 and Comparative Example 14, if the amount of the powdered article containing cellulose is beyond 8 parts by weight, the abrasion performance is drastically lowered and car performances are not improved more.

By the present invention there is provided a rubber composition for tire tread, having low decrease in abrasion resistance and balanced performance of traction property, braking property and cornering property.

What is claimed is:

1. A rubber composition for a tire tread comprising 100 parts by weight of at least one rubber component selected from the group consisting of a natural rubber, an isoprene rubber and a butadiene rubber, wherein said rubber component has a rubber hardness of 60 to 68 when measured at 25° C. and 5 to 30 parts by weight of a silica, 0.5 to 4.0 parts by weight of a silane coupling agent and 3 to 8 parts by weight of a rice husk of rice.

2. The rubber composition for a tire tread of claim 1, wherein an average diameter of the rice husk of rice is 20–600 μm.

3. A truck and bus tire having a tire tread, wherein the tire tread comprises the rubber composition of claim 2.

4. A truck and bus tire having a tire tread, wherein the tire tread comprises the rubber composition of claim 1.

5. The rubber composition for a tire tread of claim 2, wherein the average diameter of the rice husk of rice is 100–200 μm.

6. The rubber composition for a tire tread of claim 2, wherein the average diameter of the rice husk of rice is 100–120 μm.

* * * * *